United States Patent
Arroyo et al.

(10) Patent No.: US 12,400,197 B2
(45) Date of Patent: Aug. 26, 2025

(54) GESTURE RECOGNITION FOR ADVANCED SECURITY

(71) Applicant: Truist Bank, Charlotte, NC (US)

(72) Inventors: Yadhira Haydee Arroyo, Chicago, IL (US); Ryan Hepford, Raleigh, NC (US); Gaurav Sinha, Hawthorne, CA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 17/848,032

(22) Filed: Jun. 23, 2022

(65) Prior Publication Data
US 2023/0419280 A1      Dec. 28, 2023

(51) Int. Cl.
*G06Q 20/40* (2012.01)
*G06Q 20/10* (2012.01)
(Continued)

(52) U.S. Cl.
CPC ....... *G06Q 20/1085* (2013.01); *H04L 63/083* (2013.01)

(58) Field of Classification Search
None
See application file for complete search history.

(56) References Cited

U.S. PATENT DOCUMENTS

| | | | | |
|---|---|---|---|---|
| 5,519,669 A | * | 5/1996 | Ross | G01S 15/02 340/541 |
| 5,712,830 A | * | 1/1998 | Ross | G01S 15/02 340/541 |

(Continued)

FOREIGN PATENT DOCUMENTS

| | | | | |
|---|---|---|---|---|
| CA | 3033315 A1 | * | 2/2018 | ......... G08B 21/0453 |
| CA | 3125055 A1 | * | 7/2020 | ......... G06K 9/00268 |

(Continued)

OTHER PUBLICATIONS

CN-113792624-A. English Language Translation. Google Translate. "Early warning security monitoring method for bank ATM". 2018. https://patents.google.com/patent/CN113792624A/en?oq=CN-113792624-A (Year: 2021).*

(Continued)

*Primary Examiner* — Ayal I. Sharon

(74) *Attorney, Agent, or Firm* — Kilpatrick Townsend & Stockton LLP; Michael A. Springs, Esq.

(57) ABSTRACT

Security can be provided for a user in a banking environment by detecting a gesture. For example, a system described herein can include a sensing device positionable to detect the gesture from the user. The system can include a processor and a non-transitory computer-readable medium that includes instructions executable by the processor to perform operations. The operations can include receiving a notification of the gesture from the sensing device. The operations can also include receiving an input from the user to select an automated teller machine (ATM) operation. The operations can further include determining an intent of the gesture from the sensing device. The operations can include controlling the ATM operation based on the input from the user. Additionally, the operations can include transmitting a request separate from the ATM operation based on the notification of the gesture.

13 Claims, 3 Drawing Sheets

(51) Int. Cl.
*G06V 40/50* (2022.01)
*H04L 9/40* (2022.01)

(56) References Cited

U.S. PATENT DOCUMENTS

| | | | | |
|---|---|---|---|---|
| 8,630,820 | B2* | 1/2014 | Amis | G08B 25/016 |
| | | | | 702/186 |
| 10,990,955 | B2* | 4/2021 | Skelsey | G06Q 20/3221 |
| 11,087,109 | B1* | 8/2021 | Strohmann | G06V 40/1306 |
| 11,216,149 | B2* | 1/2022 | Yoganandan | G06F 3/04886 |
| 11,275,446 | B2* | 3/2022 | Franklin | G06F 9/453 |
| 11,348,357 | B1* | 5/2022 | Tiwari | G06F 3/0416 |
| 11,823,536 | B1* | 11/2023 | Arroyo | G06Q 20/4016 |
| 11,935,090 | B1* | 3/2024 | Goetz | G06Q 30/0238 |
| 2011/0046920 | A1* | 2/2011 | Amis | G08B 25/016 |
| | | | | 709/217 |
| 2014/0071037 | A1* | 3/2014 | Cohen | G06V 40/25 |
| | | | | 345/156 |
| 2014/0118140 | A1* | 5/2014 | Amis | G08B 25/08 |
| | | | | 340/539.13 |
| 2015/0294432 | A1* | 10/2015 | Jones | G06Q 50/265 |
| | | | | 705/325 |
| 2016/0148488 | A1* | 5/2016 | Tijerina | G07F 9/026 |
| | | | | 705/325 |
| 2016/0149945 | A1* | 5/2016 | Tijerina | H04L 63/1433 |
| | | | | 726/25 |
| 2016/0277397 | A1* | 9/2016 | Watanabe | H04L 63/0861 |
| 2018/0103859 | A1* | 4/2018 | Provenzano | A61B 5/0024 |
| 2018/0137263 | A1* | 5/2018 | Kurian | G06F 3/167 |
| 2018/0137264 | A1* | 5/2018 | Kurian | H04L 67/12 |
| 2018/0292907 | A1* | 10/2018 | Katz | G06F 3/017 |
| 2019/0094967 | A1* | 3/2019 | Bisbee | G06F 3/016 |
| 2019/0312966 | A1* | 10/2019 | Shin | H04W 4/90 |
| 2019/0333076 | A1* | 10/2019 | Chen | G06V 40/172 |
| 2020/0084607 | A1* | 3/2020 | Geller | H04W 4/90 |
| 2020/0413202 | A1* | 12/2020 | Kusano | H04R 31/00 |
| 2021/0073511 | A1* | 3/2021 | Buchan | G01N 29/2437 |
| 2021/0350099 | A1* | 11/2021 | Buchan | H04L 9/3231 |
| 2022/0014916 | A1* | 1/2022 | Gillis | H04W 12/30 |
| 2022/0198173 | A1* | 6/2022 | Azumi | G06V 40/1306 |
| 2022/0261083 | A1* | 8/2022 | Franklin | G06F 9/453 |
| 2023/0085885 | A1* | 3/2023 | Sreeram | G06F 3/048 |
| | | | | 455/404.1 |
| 2024/0037529 | A1* | 2/2024 | Lal | G06Q 20/229 |

FOREIGN PATENT DOCUMENTS

| | | | | |
|---|---|---|---|---|
| CN | 106934955 | A | * 7/2017 | |
| CN | 206584461 | U | * 10/2017 | |
| CN | 109377682 | A | * 2/2019 | G06K 9/00228 |
| CN | 113792624 | A | * 12/2021 | |
| WO | WO-2015023109 | A1 | * 2/2015 | G06F 15/16 |
| WO | WO-2016085827 | A1 | * 6/2016 | G06Q 20/206 |
| WO | WO-2017035825 | A1 | * 3/2017 | |

OTHER PUBLICATIONS

CN-109377682-A. English Language Translation. Google Translate. "A kind of facial pose anomalous identification alarm ATM cash dispenser device". 2018. https://patents.google.com/patent/CN109377682A/en?oq=CN-109377682-A (Year: 2018).*

WO-2017035825-A1 Google Patents English Translation. https://patents.google.com/patent/WO2017035825A1/en?oq=WO2017035825A1 (Year: 2024).*

CA-3033315-A1 Google Patents English Translation. https://patents.google.com/patent/CA3033315A1/en?oq=CA+3033315+A1 (Year: 2024).*

Google Patents English translation of CN-206584461-U. https://patents.google.com/patent/CN206584461U/en?oq=CN-206584461-U (Year: 2024).*

Google Patents English translation of CN-106934955-A. https://patents.google.com/patent/CN106934955A/en?oq=CN-106934955-A (Year: 2024).*

Google Patents English Language Translation of WO-2015023109-A1. https://patents.google.com/patent/WO2015023109A1/en?oq=WO-2015023109-A1 (Year: 2024).*

* cited by examiner

GESTURE RECOGNITION FOR ADVANCED SECURITY

TECHNICAL FIELD

The present disclosure relates generally to banking operations and, more particularly (although not necessarily exclusively), to gesture recognition for advanced security.

BACKGROUND

Security can be a concern in banking environments such as an environment that includes an automated teller machine (ATM). A would-be thief can know that an individual using an ATM can leave the ATM with cash in their possession after a withdrawal of funds. If an individual is the victim of an ATM robbery, other personal property can be taken such as wallets, credit cards, jewelry, and personal information. There can be a need for security in banking environments.

SUMMARY

Security can be provided for a user in a banking environment by detecting a gesture. For example, a system described herein can include a sensing device positionable to detect the gesture from the user. The system can include a processor and a memory that includes instructions executable by the processor device to perform operations. The operations can include receiving a notification of the gesture from the sensing device. The operations can also include receiving an input from the user to select an automated teller machine (ATM) operation. Additionally, the operations can include determining an intent of the gesture from the sensing device. The operations can include controlling the ATM operation based on the input from the user and transmitting a request separate from the ATM operation based on the notification of the gesture.

In another example, a method described herein can include receiving a notification of a gesture from a sensing device. The method can further include receiving an input from a user to select an automated teller machine (ATM) operation. Additionally, the method can include determining intent of the gesture from the sensing device. Further, the method can include controlling the ATM operation based on the input from the user and transmitting a request to authorities based on the notification of the gesture.

In an example, a non-transitory computer-readable medium includes instructions that are executable by a processor for causing the processor to perform operations including receiving a notification of a gesture from a sensing device. The operations can further include receiving an input from a user to select an automated teller machine (ATM) operation. Additionally, the operations can include determining intent of the gesture from the sensing device. Further, the operations can include controlling the ATM operation based on the input from the user. The operations can also include transmitting a request to authorities based on the notification of the gesture.

DETAILED DESCRIPTION

Certain aspects and examples of the present disclosure relate to gesture recognition for advanced security. A user in a banking environment can initiate a protocol that can provide security for the user by making a gesture. For example, a user can arrive at an ATM to drop off money for business. The user can notice a suspicious person standing too close or otherwise acting suspiciously.

The user can respond to such a situation by making a gesture at a sensing device of the ATM or a wearable device, providing an input code for the ATM, or a combination thereof. The input can include typing a fake personal identification number (PIN) or a passcode. For example, the gesture can include a facial expression (e.g., a wink) toward a camera of the ATM or the user clenching their fist. A sensing device, such as a smartwatch worn by the user, can detect some of these gestures and recognize an intent of the gesture. For example, the intent of the gesture can be a distress signal. The fake PIN or passcode can be associated with distress and can be used to confirm the intent of the gesture. The intent of the gesture can be determined in such a way that the suspicious person is not alerted that the user is responding to them.

A computing device can receive notification of the gesture and the intent of the gesture from the sensing device. The computing device can control the ATM based on the input. For example, the computing device can lock the user's bank account based on the input (e.g., the ATM will not output cash in response to the user's input). The computing device can contact authorities to report the distress signal. In some examples, in response to the notification of the gesture, the computing device can cause the user's smartwatch, smartphone, and the ATM to record video using all available cameras. The authorities can arrive and stop any attempted criminal activity.

Gesture recognition can provide users with security in banking environments. By using a simple gesture, users can transmit a distress signal to a computing device and stop a crime without alarming a would-be criminal.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
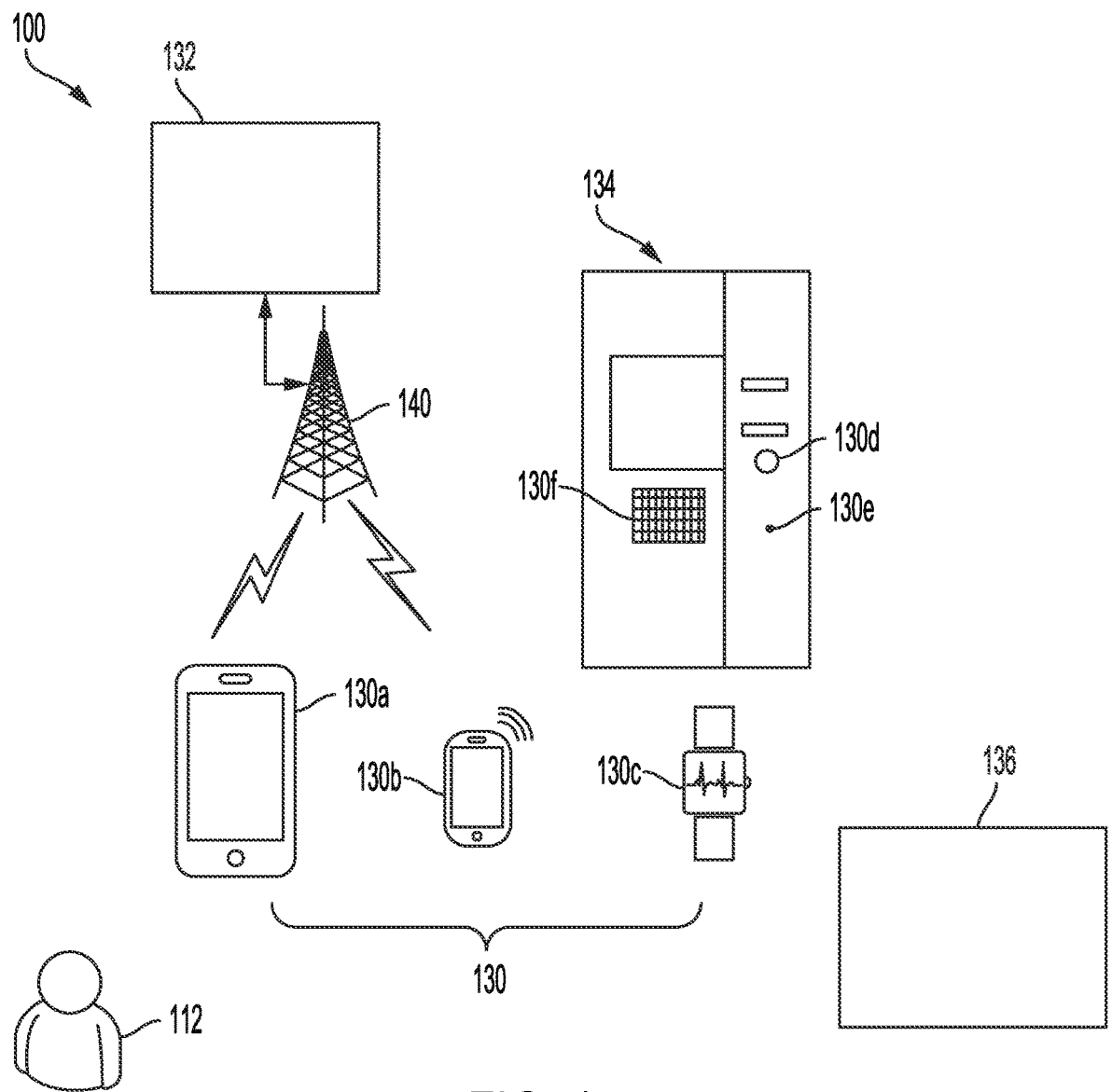
FIG. 1 is a schematic of a banking environment in which a user can be provided advanced security based on gesture recognition according to one example of the present disclosure.

FIG. 1 is a schematic of a banking environment 100 in which a user 112 can be provided advanced security based on gesture recognition according to one example of the present disclosure. Included in the banking environment 100 are the user 112, one or more sensing devices 130, one or more communication networks 140, an ATM 134, and a computing device 132. The banking environment 100 can also include authorities 136. The one or more sensing devices 130 and the ATM 134 may send or receive communication with the computing device 132 over the one or more communication networks 140. The one or more communication networks 140 may correspond to one or more Wide Area Networks ("WANs"), such as the Internet, through which the one or more sensing devices 130, the ATM 134, and the computing device 132 may communicate with servers via web browsers or client-side applications, to establish communication sessions, request and receive web-based resources, and access other features of applications or services. Although illustrated separate from the ATM 134 in the banking environment 100, in certain examples, the computing device 132 can be included within the ATM 134 and in other examples, the computing device 132 can be situated in a remote location away from the banking environment 100.

The one or more sensing devices 130, which can include suitable sensor devices for accessing web-based resources or application-based resources, can be capable of accessing and establishing communication sessions with the computing device 132 through the one or more communication networks 140. As illustrated in FIG. 1, sensing devices 130a-130c correspond to mobile devices, including tablet computers 130a, smartphones 130b, and smart watches 130c, which may access the computing device 132 via a Local Area Network ("LAN") or Wide Area Network ("WAN"), as well as mobile telecommunication networks, short-range wireless networks, or various other communication network types (e.g., cable or satellite networks). Sensing devices 130d-130f correspond to sensing devices associated with the ATM, including an ATM camera 130d, an ATM microphone 130e, and an ATM keypad 130f. Although certain examples herein are described in terms of mobile devices, in other examples, the one or more sensing devices 130 may additionally or alternatively include other mobile or non-mobile devices (e.g., desktop computers, laptop computers, and the like) capable of accessing the computing device 132 via the one or more communications networks 140. The one or more sensing devices 130 and the ATM 134 can be capable of recording audio or video of an ATM operation.

The one or more sensing devices 130 can detect a gesture from the user 112. The ATM 134 can receive input from the user 112. The input to the ATM 134 can include a user's PIN, a passcode, or a fake PIN. The computing device 132 can receive notification of the gesture and an intent of the gesture from the one or more sensing devices 130. In some examples, the input to the ATM 134 can verify the intent of the gesture from the user 112. For example, a pre-determined code that is not a normal ATM code for the user 112 may confirm the gesture intent. The computing device 132 can receive the input from the user from the ATM 134 and can control ATM operations based on the input.

In an example, the computing device can transmit a request to the authorities 136. The authorities 136 can include a bank manager, police station, paramedics, an emergency call center, etc., or any suitable combination of the foregoing. In some examples, the computing device 132 can identify a police station located near the ATM 134. Transmitting the request can include contacting the police station to report a distress signal. Additionally, the request can include informing a bank manager of a bank associated with the ATM 134 of the distress signal.

Figure 2:
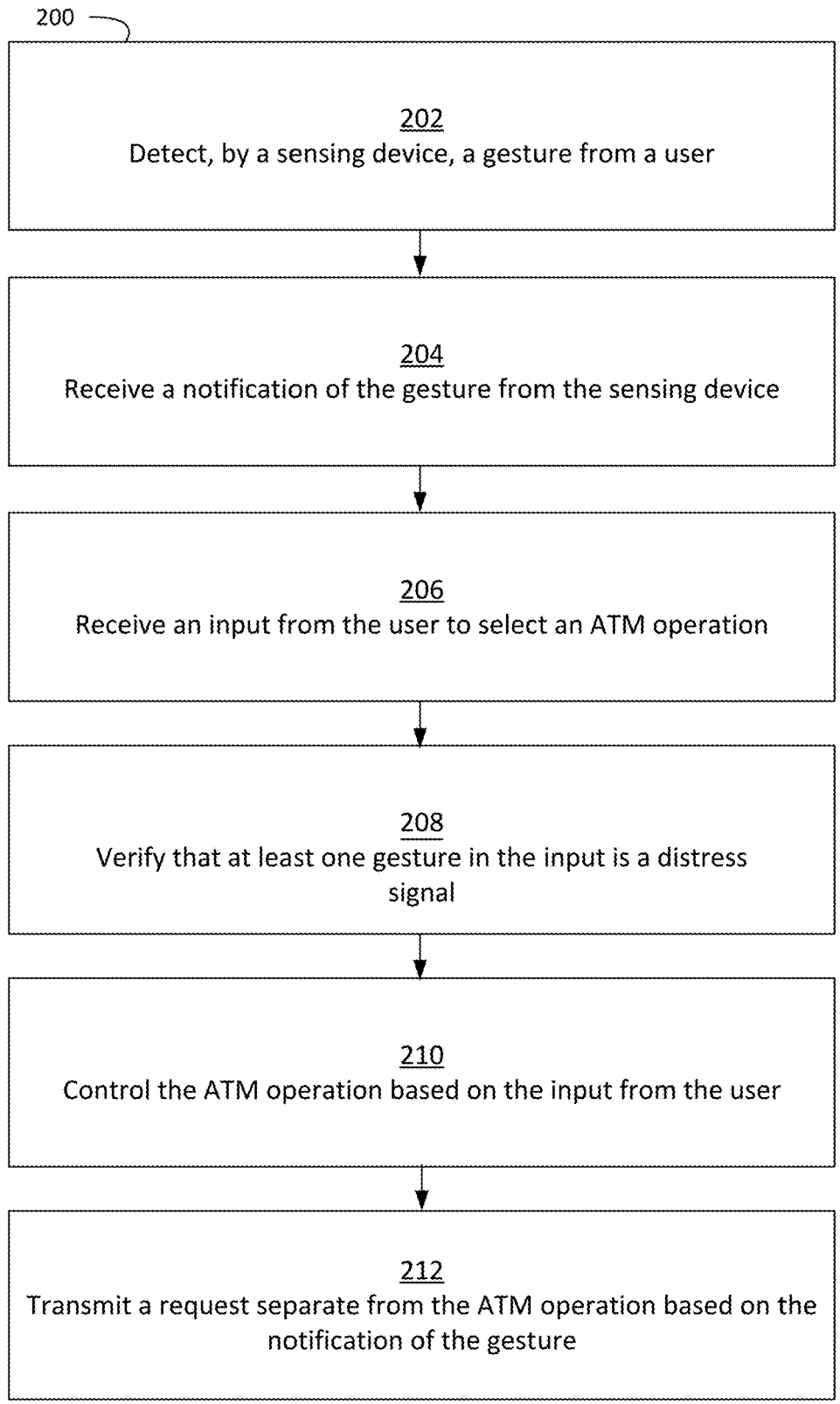
FIG. 2 is a flowchart of a process for providing advanced security based on gesture recognition according to one example of the present disclosure.

FIG. 2 is a flowchart of a process 200 for providing advanced security based on gesture recognition according to one example of the present disclosure. Operations of flowcharts may be performed by software, firmware, hardware, or a combination thereof. The operations of the flowchart start at block 202.

At block 202, the process 200 involves detecting, by a sensing device 130, a gesture from a user 112. The sensing device 130 can, for example, include a smart device, smart phone, a tablet computer, wearable technology like a smart-watch, a smart camera, a laptop computer, an ATM camera, an ATM microphone, an ATM keypad, a hidden input device (e.g., a hidden token device), a bank tablet/"kiosk", or any suitable combination of the foregoing. There can be more than one sensing device 130 present.

The gesture from the user 112 can include any form of movement or vocal utterance detectable by the sensing device 130. For example, the user 112 can clench one or both of the user's fists to indicate a gesture. Gestures can also include voice codes such as a particular phrase, facial expressions (e.g., a wink), etc. Gestures can also include a motion of an extremity such as the user 112 stretching their legs, swinging their arms, etc. In some examples, a passcode entered into the ATM 134 can denote a gesture.

At block 204, the process 200 involves receiving a notification of the gesture from the sensing device 130. The sensing device 130 can be communicatively coupled to a computing device 132. The sensing device 130 may send or receive communication with the computing device 132 over one or more communication networks 140. The sensing device 130 can notify the computing device 132 of a sensed gesture from the user 112. The notification can include a location of the user 112.

At block 206, the process 200 involves receiving an input from the user 112 to select an ATM 134 operation. In some examples, the input can be a passcode. The passcode can verify an intent of the gesture from the user 112. For example, when the intent of the gesture is a distress signal, the user 112 can also input the passcode into the ATM 134. The passcode can confirm that the user 112 is in distress. In some examples, the passcode can contradict the gesture. For example, the user can make a gesture that indicates distress and then determine that they are not in distress (e.g., they may realize that the suspicious person is a friend after making the gesture). The user can input a passcode that contradicts the intent of the gesture, effectively cancelling any response to the gesture. In some examples, the passcode itself can denote the gesture.

The ATM 134 may send or receive communication with the computing device 132 over one or more communication networks 140. In some examples, the ATM 134 can notify the computing device 132 of the input from the user 112 and indicate a location of the ATM 134.

At block 208, the process 200 involves verifying that at least one gesture in the input is a distress signal. For example, the process involves determining intent of the gesture from the sensing device. The gesture can have a predetermined meaning. For example, clenching fists can indicate an intent. In some examples, the intent of the gesture can be a distress signal from the user 112.

At block 210, the process 200 involves controlling the ATM operation based on the input from the user 112 and the gesture received from the user 112 at the sensing device. For example, when the input and gesture from the user 112 indicates that the user 112 is in distress, the computing device 132 can alter how the an ATM transaction occurs. For example, the computing device 132 can cause the ATM 134 to lockdown the bank account of the user 112. The ATM 134 can temporarily freeze assets associated with the bank account. The computing device 132 can command the ATM 134 and the sensing device 130 to record audio and video. If a sensing device has multiple cameras, the sensing device 130 can record video from each of the multiple cameras. In some examples, the computing device 132 can instruct the ATM 134 to post a message on a display of the ATM 134 indicating that there are insufficient funds for the transaction such that a suspicious person is aware that the user is walking away without money from the ATM 134.

At block 212, the process 200 involves transmitting a request separate from the ATM operation based on the notification of the gesture. The request can be sent from the computing device 132 to authorities 136. Authorities 136 can include a bank manager, police station, paramedics, an emergency call center, etc., or any suitable combination of the foregoing. In some examples, like when the intention of the gesture indicates distress, the computing device 132 can transmit the request to the authorities 136 that are closest to the location of the user 112 and the ATM 134.

The computing device 132 can identify a police station located near the ATM 134. The computing device 132 can contact the police station and report the distress signal at the ATM 134. The computing device 132 can also inform a bank manager of a bank associated with the ATM 134 of the distress signal. In the request, the computing device 132 can notify the authorities of the intent of the gesture received from the user 112. In some examples, the computing device 132 can request that the authorities 136 send police officers, paramedics, etc. to the location of the user 112 and the ATM 134.

Figure 3:
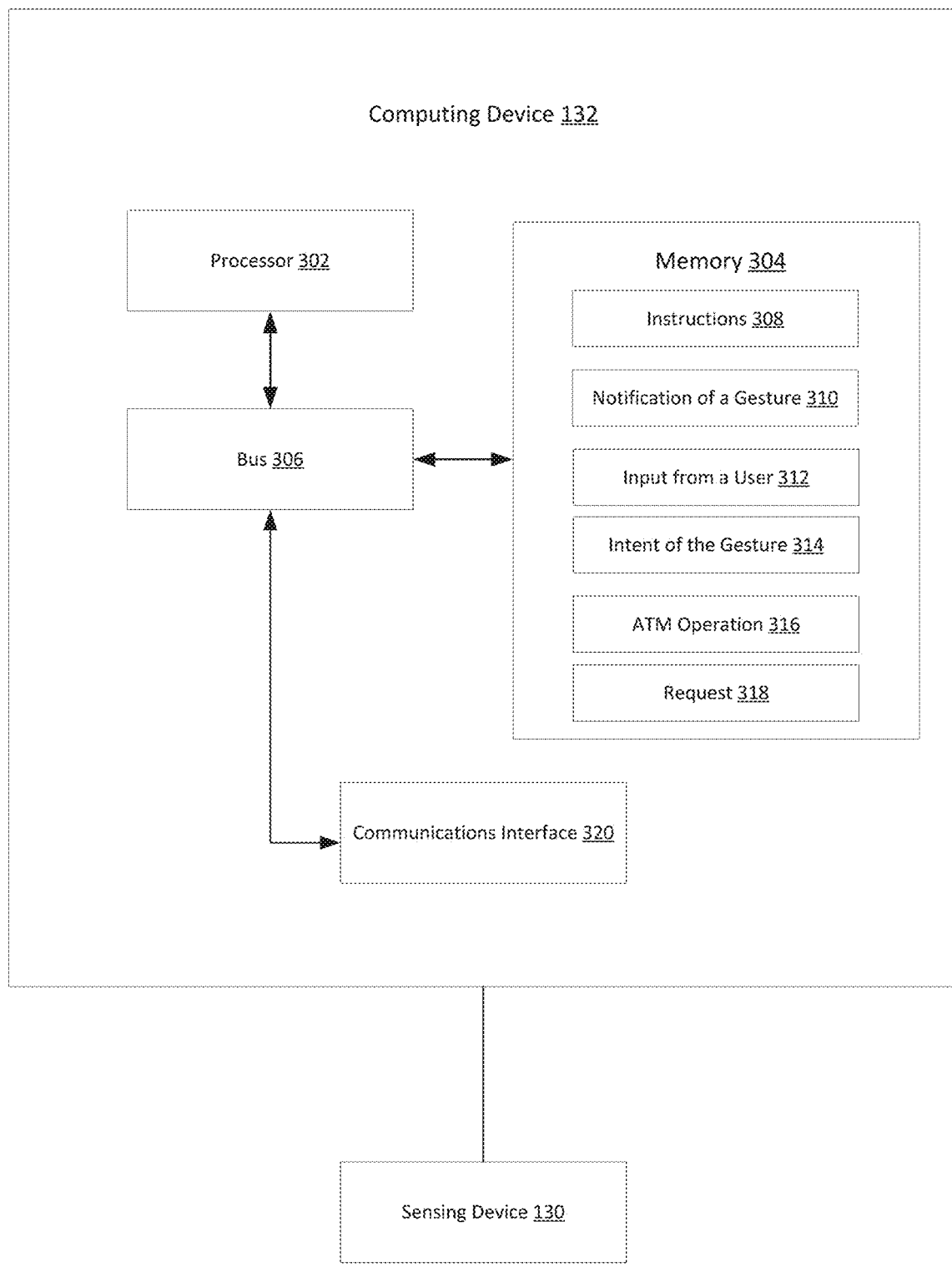
FIG. 3 is a block diagram of an example of a computing device for providing advanced security based on gesture recognition according to one example of the present disclosure.

FIG. 3 is a block diagram of an example of a computing device 132 for providing advanced security based on gesture recognition according to one example of the present disclosure. The components in FIG. 3, such as a processor 302, a memory 304, a bus 306, and the like, may be integrated into a single structure such as within a single housing of the computing device 132 or within the ATM 134. Alternatively, the components shown in FIG. 3 can be distributed from one another and in electrical communication with each other.

As shown, the computing device 132 includes the processor 302 communicatively coupled to the memory 304 by the bus 306. The processor 302 can include one processor or multiple processors. Non-limiting examples of the processor 302 include a Field-Programmable Gate Array (FPGA), an application specific integrated circuit (ASIC), a microprocessor, or any combination of these. The processor 302 can execute instructions 308 stored in the memory 304 to perform operations. In some examples, the instructions 308 stored in the memory 304 can include processor-specific instructions generated by a compiler or an interpreter from code written in any suitable computer-programming language, such as C, C++, C#, or Java.

The memory 304 can include one memory device or multiple memory devices. The memory 304 can be non-volatile and may include any type of memory device that retains stored information when powered off. Non-limiting examples of the memory 304 include electrically erasable and programmable read-only memory (EEPROM), flash memory, or any type of non-volatile memory. At least some of the memory 304 can include a non-transitory computer-readable medium from which the processor 302 can read the instructions 308. The non-transitory computer-readable medium can include electronic, optical, magnetic, or other storage devices capable of providing the processor 302 with the instructions 308 or other program code. Non-limiting examples of the non-transitory computer-readable medium include magnetic disk(s), memory chip(s), RAM, an ASIC, or any other medium from which a computer processor can read instructions.

The computing device 132 also includes the bus 306 (e.g., PCI, ISA, PCI-Express, Hyper-Transport® bus, Infini-Band® bus, NuBus, etc.) and a communications interface 320 (e.g., a Fiber Channel interface, wireless interface, etc.)

Realizations may include fewer or additional components not illustrated in FIG. 3 (e.g., video cards, audio cards, additional communication interfaces, peripheral devices, etc.) The processor 302 and the communication interface 320 are coupled to the bus 306. Although illustrated as being coupled to the bus 306, the memory 304 may be coupled to the processor 302.

Additionally, the memory 304 can include a notification of a gesture 310, input from a user 312, intent of the gesture 314, an ATM operation 316, and a request 318. The computing device 132 can receive the notification of the gesture 310 and the intent of the gesture 314 from a sensing device 130 by means of the communications interface 320. The computing device 132 may send or receive communication with the sensing device 130 and an ATM 134 over one or more communication networks 140. The input from the user 112 may be received by the computing device 132 from the ATM 134. The processor 302 may control the ATM operation 316 based on the input from the user 312. The processor may transmit the request 318 to authorities 136 based on the intent of the gesture 314.

In some examples, the computing device 132 can implement the process 200 shown in FIG. 2 for effectuating some aspects of the present disclosure. Other examples can involve more operations, fewer operations, different operations, or a different order of the operations shown in FIG. 2.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   a sensing device that comprises a smart device positionable to detect a set of contactless gestures from a user;
   a processor; and
   a non-transitory computer-readable medium that includes instructions executable by the processor to perform operations comprising:
   receiving a notification of at least one gesture of the set of contactless gestures from the smart device;
   receiving an input from the user to select an automated teller machine (ATM) operation;
   determining that the at least one gesture from the smart device is a facial expression that indicates a predetermined meaning defined in the system, wherein the predetermined meaning is a distress signal;
   verifying that the at least one gesture is the distress signal based on receiving a different and subsequent confirmation input provided by the user, wherein the different and subsequent confirmation input is a second gesture of the set of contactless gestures that is different than the at least one gesture;
   altering the ATM operation based on the predetermined meaning of the at least one gesture and causing the smart device to record video;
   identifying a police station located near the ATM;
   contacting the police station to report the distress signal at the ATM; and
   informing a bank manager of a bank associated with the ATM of the distress signal.

2. The system of claim 1, wherein the operations further comprise transmitting a request separate from the ATM operation based on the predetermined meaning of the gesture.

3. The system of claim 1, wherein the smart device comprises a smart watch.

4. The system of claim 1, wherein the input from the user comprises a passcode associated with the at least one gesture to confirm the predetermined meaning of the distress signal.

5. The system of claim 1, wherein the at least one gesture is a first facial expression, and wherein the second gesture is a second facial expression that is different from the first facial expression.

6. A computer-implemented method comprising:
- receiving a notification of at least one gesture from a smart device included with a sensing device of a system, the sensing device configured for detecting a set of contactless gestures that includes the at least one gesture;
- receiving an input from a user to select an automated teller machine (ATM) operation;
- determining that the at least one gesture from the smart device is a facial expression that indicates a predetermined meaning defined in a system, wherein the predetermined meaning is a distress signal;
- verifying that the at least one gesture is the distress signal based on receiving a different and subsequent confirmation input provided by the user, wherein the different and subsequent confirmation input is a second gesture of the set of contactless gestures that is different than the at least one gesture;
- altering the ATM operation based on the predetermined meaning of the at least one gesture and causing the smart device to record video;
- identifying a police station located near the ATM;
- contacting the police station to report the distress signal at the ATM; and
- informing a bank manager of a bank associated with the ATM of the distress signal.

7. The computer-implemented method of claim 6, further comprising transmitting a request separate from the ATM operation based on the predetermined meaning of the gesture.

8. The computer-implemented method of claim 6, wherein the smart device comprises a smart watch.

9. The computer-implemented method of claim 6, further comprising receiving, by the ATM, a passcode associated with the at least one gesture to confirm the predetermined meaning of the distress signal.

10. A non-transitory computer-readable medium comprising instructions that are executable by a processor for causing the processor to perform operations comprising:
- receiving a notification of at least one gesture from a smart device included with a sensing device, the sensing device configured for detecting a set of contactless gestures that includes the at least one gesture;
- receiving an input from a user to select an automated teller machine (ATM) operation;
- determining that the at least one gesture from the smart device is a facial expression that indicates a predetermined meaning defined in a system, wherein the predetermined meaning is a distress signal;
- verifying that the at least one gesture is the distress signal based on receiving a different and subsequent confirmation input provided by the user, wherein the different and subsequent confirmation input is a second gesture of the set of contactless gestures that is different than the at least one gesture;
- altering the ATM operation based on the predetermined meaning of the at least one gesture and causing the smart device to record video;
- identifying a police station located near the ATM;
- contacting the police station to report the distress signal at the ATM; and
- informing a bank manager of a bank associated with the ATM of the distress signal.

11. The non-transitory computer-readable medium of claim 10, wherein the operations further comprise transmitting a request separate from the ATM operation based on the predetermined meaning of the gesture.

12. The non-transitory computer-readable medium of claim 10, wherein the smart device comprises a smart watch.

13. The non-transitory computer-readable medium of claim 10, wherein the input from the user comprises a passcode associated with the at least one gesture to confirm the predetermined meaning of the distress signal.

* * * * *